(12) United States Patent
Poorebrahim Gilkalaye et al.

(10) Patent No.: US 11,539,679 B1
(45) Date of Patent: Dec. 27, 2022

(54) SYSTEMS AND METHODS FOR PROVIDING A QUANTUM-PROOF KEY EXCHANGE

(71) Applicant: TripleBlind, Inc., Kansas City, MO (US)

(72) Inventors: Babak Poorebrahim Gilkalaye, Kansas City, MO (US); Mitchell Roberts, Stilwell, KS (US); Greg Storm, Parkville, MO (US); Riddhiman Das, Parkville, MO (US)

(73) Assignee: TripleBlind, Inc., Kansas City, MO (US)

( * ) Notice: Subject to any disclaimer, the term of this patent is extended or adjusted under 35 U.S.C. 154(b) by 0 days.

(21) Appl. No.: 17/592,905

(22) Filed: Feb. 4, 2022

(51) Int. Cl.
*H04L 9/40* (2022.01)
*H04L 9/14* (2006.01)
*H04L 9/00* (2022.01)
*H04L 9/08* (2006.01)

(52) U.S. Cl.
CPC ............ *H04L 63/061* (2013.01); *H04L 9/008* (2013.01); *H04L 9/14* (2013.01); *H04L 9/0852* (2013.01)

(58) Field of Classification Search
CPC ......... H04L 63/061; H04L 9/008; H04L 9/14; H04L 9/0852
See application file for complete search history.

(56) References Cited

U.S. PATENT DOCUMENTS

| | | | | |
|---|---|---|---|---|
| 1,045,208 | A * | 11/1912 | Spencer | B23B 5/16 408/103 |
| 10,362,001 | B2 * | 7/2019 | Yan | H04L 63/0428 |
| 10,419,360 | B2 * | 9/2019 | Dawson | H04L 47/787 |
| 10,529,012 | B2 * | 1/2020 | Dawson | H04W 28/22 |
| 10,560,872 | B2 * | 2/2020 | Dawson | H04W 4/24 |

(Continued)

OTHER PUBLICATIONS

Nir et al., "Post-quantum Zero Knowledge in Constant Rounds"; Jun. 2020; 11 pages. (Year: 2020).*

(Continued)

*Primary Examiner* — Yonas A Bayou (57) ABSTRACT

A system and method are disclosed for providing a quantum proof key exchange. The method includes generating at a first computing device a random bit $a_i$, encrypting $a_i$ using quantum-proof homomorphic encryption $\xi$ to yield $\xi_A(a_i)$, transmitting $\xi_A(a_i)$ to a second computing device, generating at the second computing device a random bit $b_i$, encrypting $b_i$ using the quantum-proof homomorphic encryption $\xi$ to yield $\xi_B(b_i)$, transmitting $\xi_B(b_i)$ to the first computing device and generating a common key between the first computing device and the second computing device based on $\xi_A(a_i)$ and $\xi_B(b_i)$.

20 Claims, 5 Drawing Sheets

(56) References Cited

U.S. PATENT DOCUMENTS

| | | | |
|---|---|---|---|
| 10,594,623 B2* | 3/2020 | Dawson | G06Q 30/08 |
| 10,623,998 B2* | 4/2020 | Dawson | H04L 12/145 |
| 11,316,676 B2* | 4/2022 | Kinjo | H04L 9/3093 |
| 2006/0233377 A1* | 10/2006 | Chang | H04L 9/0838 |
| | | | 380/278 |
| 2014/0108813 A1 | 4/2014 | Pauker | |
| 2016/0103901 A1 | 4/2016 | Kadav | |
| 2016/0342608 A1 | 11/2016 | Burshteyn | |
| 2017/0372201 A1 | 12/2017 | Gupta | |
| 2018/0039884 A1 | 2/2018 | Dalton | |
| 2018/0227296 A1 | 8/2018 | Joshi | |
| 2018/0367509 A1 | 12/2018 | O'Hare | |
| 2019/0228299 A1 | 7/2019 | Chandran | |
| 2019/0294805 A1* | 9/2019 | Taylor | G06N 3/0454 |
| 2019/0312772 A1 | 10/2019 | Zhao | |
| 2020/0158745 A1 | 5/2020 | Tian | |
| 2020/0202184 A1 | 6/2020 | Shrestha | |
| 2020/0228313 A1 | 7/2020 | Storm | |
| 2020/0286145 A1 | 9/2020 | Storm | |
| 2020/0322141 A1* | 10/2020 | Kinjo | H04L 9/0852 |
| 2020/0372360 A1 | 11/2020 | Vu | |
| 2021/0019605 A1 | 1/2021 | Rouhani | |
| 2021/0026860 A1 | 1/2021 | Wang | |
| 2021/0035330 A1 | 2/2021 | Xie | |
| 2021/0064760 A1 | 3/2021 | Sharma | |
| 2021/0142177 A1 | 5/2021 | Mallya | |
| 2021/0150024 A1 | 5/2021 | Zhang | |
| 2021/0157912 A1 | 5/2021 | Kruthiveti Subrahmanyeswara Sai | |
| 2021/0248268 A1 | 8/2021 | Ardhanari | |
| 2021/0334621 A1 | 10/2021 | Shimizu | |

OTHER PUBLICATIONS

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL arXiv:2004.12088y, entire document.

* cited by examiner

SYSTEMS AND METHODS FOR PROVIDING A QUANTUM-PROOF KEY EXCHANGE

TECHNICAL FIELD

The present disclosure generally relates to key exchanges and more specifically to a quantum-proof key exchange between two computing devices.

BACKGROUND

The existing solutions for key exchange are not quantum proof as Diffie-Hellman key exchange over both numbers and elliptic curves could be solved by quantum computers. Diffie-Hellman (DH) key exchange is a method of securely exchanging cryptographic keys over a network. It was one of the first public-key protocols. DH is one of the earliest practical examples of public key exchange implemented within the field of cryptography. Diffie and Hellman published the process in 1976 and proposed the idea of a private key and a corresponding public key.

Traditionally, secure encrypted communication between two parties required that they first exchange keys by some secure physical means, such as paper key lists transported by a trusted courier. The DH key exchange method allows two parties that have no prior knowledge of each other to jointly establish a shared secret key over an insecure channel. This key can then be used to encrypt subsequent communications using a symmetric-key cipher.

DH is used to secure a variety of Internet services. However, recent research suggests that the parameters in use for many DH Internet applications are not strong enough to prevent compromise by very well-funded attackers or by quantum computers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

Propose herein is a novel approach using quantum-proof encryption to address the problem outlined above. The approach addresses the issues of potential comprise using the DH key exchange approach.

An example method includes generating at a first computing device a random bit $a_i$, encrypting $a_i$ using quantum-proof homomorphic encryption $\xi$ to yield $\xi_A(a_i)$, transmitting $\xi_A(a_i)$ to a second computing device, generating at the second computing device a random bit $b_i$, encrypting $b_i$ using the quantum-proof homomorphic encryption $\xi$ to yield $\xi_B(b_i)$, transmitting $\xi_B(b_i)$ to the first computing device and generating a common key between the first computing device and the second computing device based on $\xi_A(a_i)$ and $\xi_B(b_i)$.

Multiple random bits can be generated at the first computing device and the second computing device. The step of generating the common key between the first computing device and the second computing device based on $\xi_A(a_i)$ and $\xi_B(b_i)$ further can include computing, at the first computing device, $\xi_B(b_i+a_i)$ and transmitting $\xi_B(b_i+a_i)$ from the first computing device to the second computing device.

The method can further include computing, at the second computing device, $\xi_A(a_i+b_i)$ and transmitting $\xi_A(a_i+b_i)$ from the second computing device to the first computing device. In another aspect the method can further include decrypting, at the first computing device, $\xi_A(a_i+b_i)$ to yield $a_i+b_i$ and setting $k_i=a_i+b_i$. The method can also include decrypting, at the second computing device, $\xi_B(a_i+b_i)$ to yield $a_i+b_i$ and setting $k_i=a_i+b_i$ and then setting a common key at the first computing device and the second computing device as $k_1+2k_2+\ldots 2^n k_n$.

A system embodiment disclosed herein can include a processor and a computer-readable storage device storing instructions which, when executed by the processor, cause the processor to perform operations including generating a random bit $a_i$, encrypting $a_i$ using quantum-proof homomorphic encryption $\xi$ to yield $\xi_A(a_i)$, transmitting $\xi_A(a_i)$ to a second computing device, wherein the second computing device generates a random bit $b_i$ and encrypts $b_i$ using the quantum-proof homomorphic encryption $\xi$ to yield $\xi_B(b_i)$, receiving $\xi_B(b_i)$ from the second computing device and generating a common key between the computing device and the second computing device based on $\xi_A(a_i)$ and $\xi_B(b_i)$.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Figure 1A:
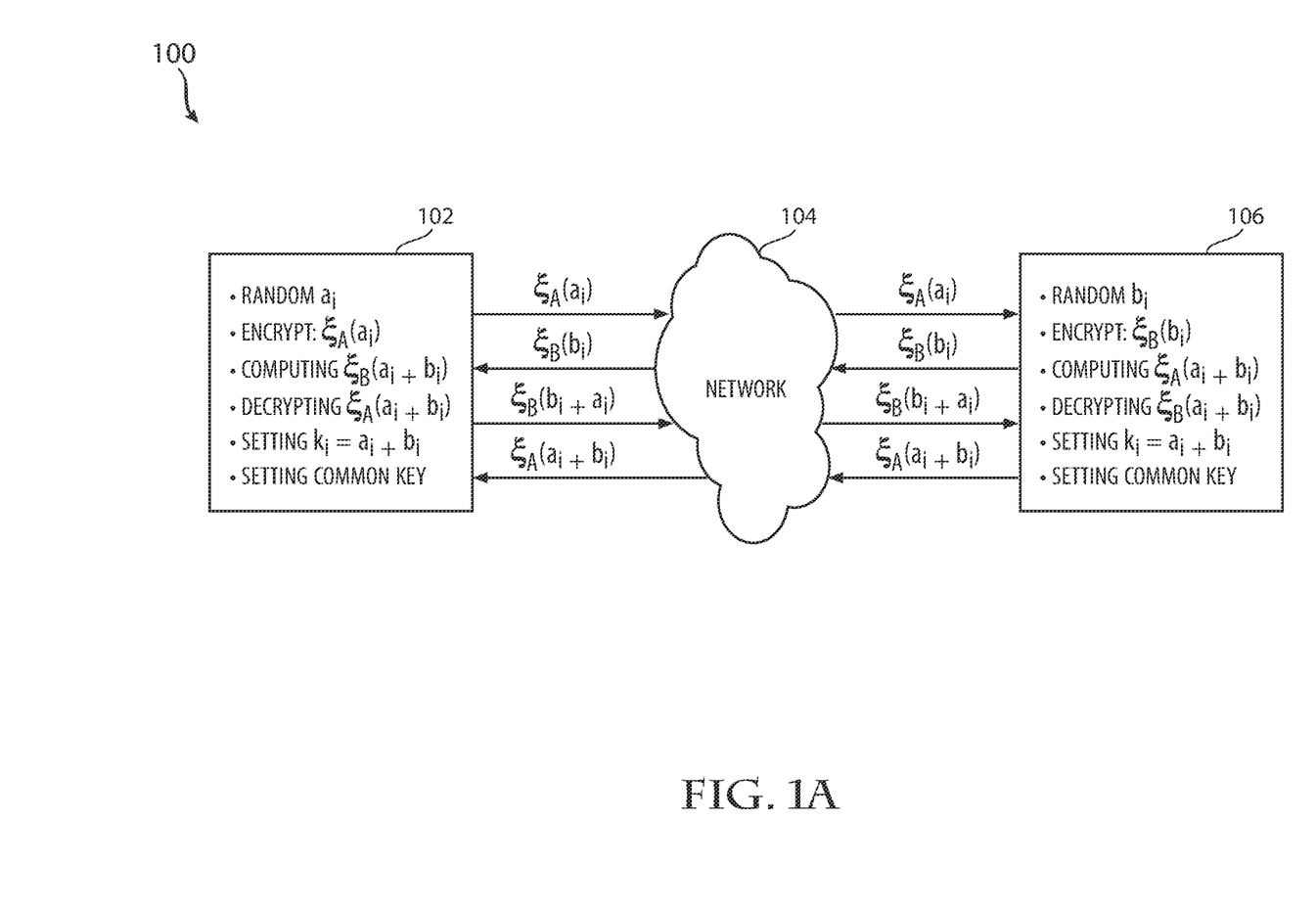
FIG. 1A illustrates a quantum-proof encryption approach.

Disclosed herein is a new system for quantum-proof encryption. Two computing devices are shown in FIG. 1A.

The system 100 can include one or both computing device 102, 106 and a network 104 of any type. The respective devices generate n bits randomly and then XOR the party's bit with the other party's bit (that is received) using homomorphic encryption and set the result as one of the key's bits.

In one example, a homomorphic encryption scheme can include a data owner encrypting data and sending it to the server. The server performs the relevant computations on the data without ever decrypting it and sends the encrypted results to the data owner.

The process can proceed as follows. For i=1 to n: let $\xi$ be a quantum-proof homomorphic encryption over field $F=Z_2$. A first party through a computing device 102 generates on random bit $a_i$ and sends $\xi_A(a_i)$ to the second party represented by a second computing device 106. Simultaneously, or separately, the second computing device 106 generates a random bit $b_i$ and sends $\xi_B(b_i)$ over the network 104 to the first computing device 102. The first computing device computes $\xi_B(b_i+a_i)$ and transmits $\xi_B(b_i+a_i)$ from the first computing device 102 to the second computing device 106. The second computing device 105b computes $\xi_A(a_i+b_i)$ and transmits $\xi_A(a_i+b_i)$ to the first computing device 102.

Figure 2:
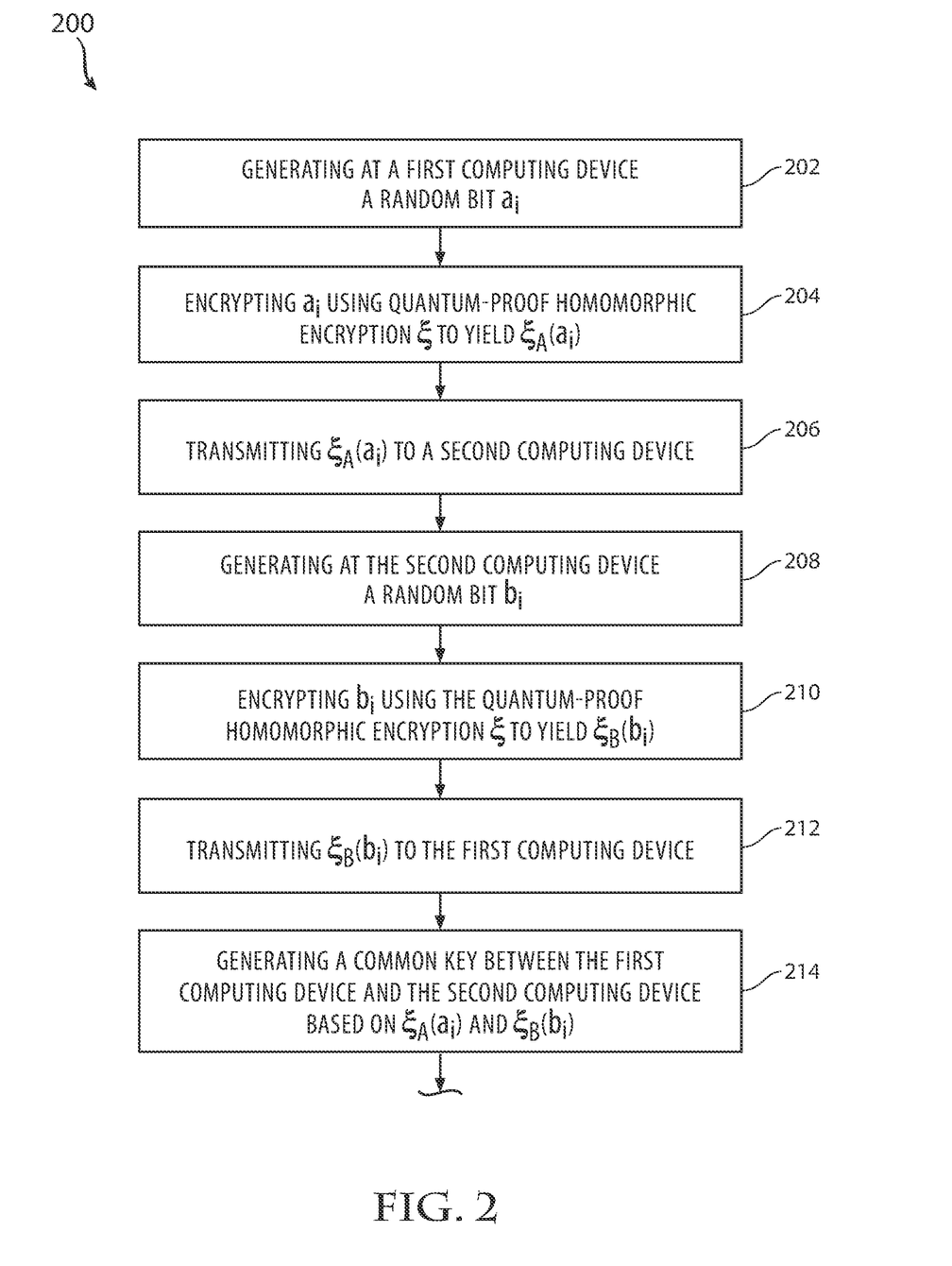
FIG. 2 illustrates a quantum-proof key exchange.

The first computing device 102 descripts $\xi_A(a_i+b_i)$ to yield $a_i+b_i$ and sets $k_i=a_i+b_i$. The second computing device descripts $\xi_B(a_i+b_i)$ to yield $a_i+b_i$ (224) and setting $k_i=a_i+b_i$ and then setting a common key at the first computing device and the second computing device as $k_1+2k_2+\ldots+2^n k_n$.

The key will be uniformly random over $2^n$, as all the bits are uniformly selected at random. To investigate the security of this approach, one can focus on the transferred data $\xi_B(b_i+a_i)$, $\xi_B(b_i)$, $\xi_A(b_i+a_i)$, $\xi_A(a_i)$, where all the values are encrypted under a quantum-proof encryption. Note that $\xi_B(b_i+a_i)$ is not equal to $\xi_B(b_i)+a_i$. If so, $a_i$ could be computed by an adversary.

Figure 1B:
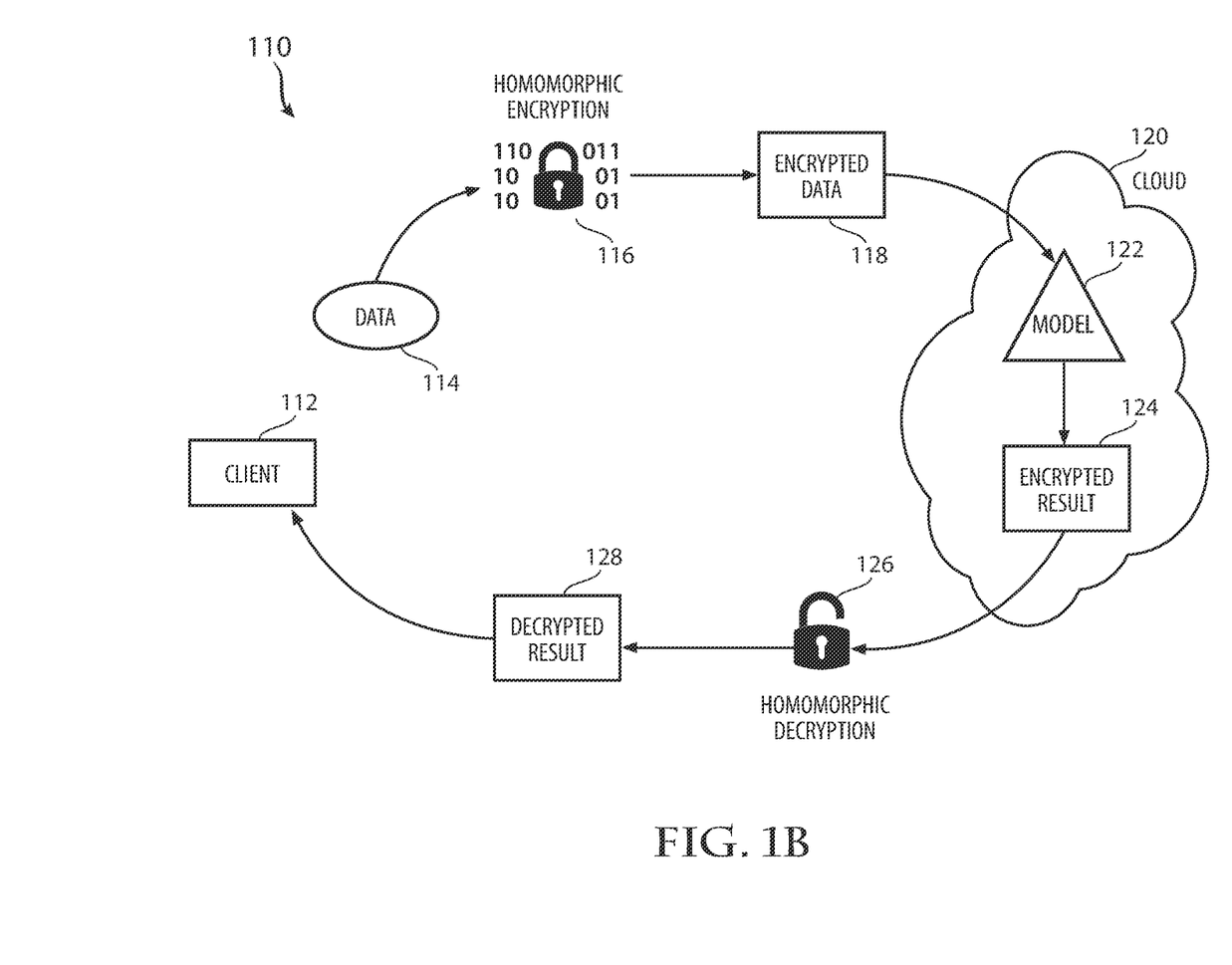
FIG. 1B illustrates homomorphic encryption.

In one aspect, the approach can be characterized as a lattice-based encryption which is quantum-proof. FIG. 1B illustrates homomorphic encryption (HE) 110 in more detail. HE is a lattice-based cryptosystem which allows us to compute on ciphertexts as if we would do them on plaintexts with the decrypted result matching the plaintext operations. Homomorphic refers to homomorphism in algebra with the encryption and decryption functions thought of as homomorphisms between plaintext and ciphertext spaces. HE systems support two operations on ciphertexts namely addition and multiplication. The scheme hides the message in noise. This makes it difficult for other operations to be performed. All other operations can be derived or approximated from these operations. HE schemes can be categorized into three types: Partially Homomorphic Encryption which supports the use of either addition or multiplication on ciphertexts, but not both. Somewhat Homomorphic Encryption allows both addition and multiplication on ciphertexts but for a finite number of operations. This limitation is due to the growth of noise associated with ciphertext. Fully Homomorphic Encryption is most powerful approach in cryptography, which allows arbitrary operations on ciphertext with no limit on the number of operations. The limitation of increasing noise is no longer a hurdle. Any of these approaches to HE can be deployed herein.

HE provides means to safeguard data 114 from a client device 112 as well as the model 122 without leaking any information. The data 114 is encrypted through homomorphic encryption 116 to form encrypted data 118 that is transmitted to another device 120 or the "cloud". A model 122 operates on the encrypted data to generate an encrypted result 124. A process of homomorphic decryption 126 produces decrypted results 128 which can be transmitted back to the client device 112. HE has been proved to work on inferences of a trained model for different neural network topologies like artificial neural network (ANN), convolutional neural network (CNN), etc. The homomorphic process described in FIG. 1B is applied to the principles disclosed herein regarding the specific operations on both a first computing device 102 and a second computing device 106.

FIG. 2 illustrates a method 200. An example method 200 includes generating at a first computing device a random bit $a_i$ (202), encrypting $a_i$ using quantum-proof homomorphic encryption $\xi$ to yield $\xi_A(a_i)$ (204), transmitting $\xi_A(a_i)$ to a second computing device (206), generating at the second computing device a random bit $b_i$, (208), encrypting $b_i$ using the quantum-proof homomorphic encryption $\xi$ to yield $\xi_B(b_i)$ (210), transmitting $\xi_B(b_i)$ to the first computing device (212) and generating a common key between the first computing device and the second computing device based on $\xi_A(a_i)$ and $\xi_B(b_i)$ (214).

Multiple random bits can be generated at the first computing device and the second computing device. The step of generating the common key between the first computing device and the second computing device based on $\xi_A(a_i)$ and $\xi_B(b_i)$ further can include computing, at the first computing device, $\xi_B(b_i+a_i)$ and transmitting $\xi_B(b_i+a_i)$ from the first computing device to the second computing device.

The method can further include computing, at the second computing device, $\xi_A(a_i+b_i)$ (216) and transmitting $\xi_A(a_i+b_i)$ from the second computing device to the first computing device (218). In another aspect the method can further include decrypting, at the first computing device, $\xi_A(a_i+b_i)$ to yield $a_i+b_i$ (220) and setting $k_i=a_i+b_i$ (222). The method can also include decrypting, at the second computing device, $\xi_B(a_i+b_i)$ to yield $a_i+b_i$ (224) and setting $k_i=a_i+b_i$ (226) and then setting a common key at the first computing device and the second computing device as $k_1+2k_2+\ldots+2^n k_n$ (228).

The method can further include using the common key for secure communication between the first computing device 102 and the second computing device 106. The step of computing, at the first computing device, $\xi_B(b_i+a_i)$, can be performed using homomorphic features of the quantum-proof homomorphic encryption $\xi$.

The step of computing, at the second computing device, $\xi_A(a_i+b_i)$, can be performed using homomorphic features of the quantum-proof homomorphic encryption $\xi$.

A system embodiment disclosed herein can include a processor and a computer-readable storage device storing instructions which, when executed by the processor, cause the processor to perform operations including generating a random bit $a_i$, encrypting $a_i$ using quantum-proof homomorphic encryption $\xi$ to yield $\xi_A(a_i)$, transmitting $\xi_A(a_i)$ to a second computing device, wherein the second computing device generates a random bit $b_i$ and encrypts $b_i$ using the quantum-proof homomorphic encryption $\xi$ to yield $\xi_B(b_i)$, receiving $\xi_B(b_i)$ from the second computing device and generating a common key between the computing device and the second computing device based on $\xi_A(a_i)$ and $\xi_B(b_i)$. The other steps outlined herein can also be performed respectively by the computing device or the second computing device.

The "system" as described can include both computing devices or may just encompass the operations performed by one of the computing devices that exchange data to generate the common key.

Figure 3:
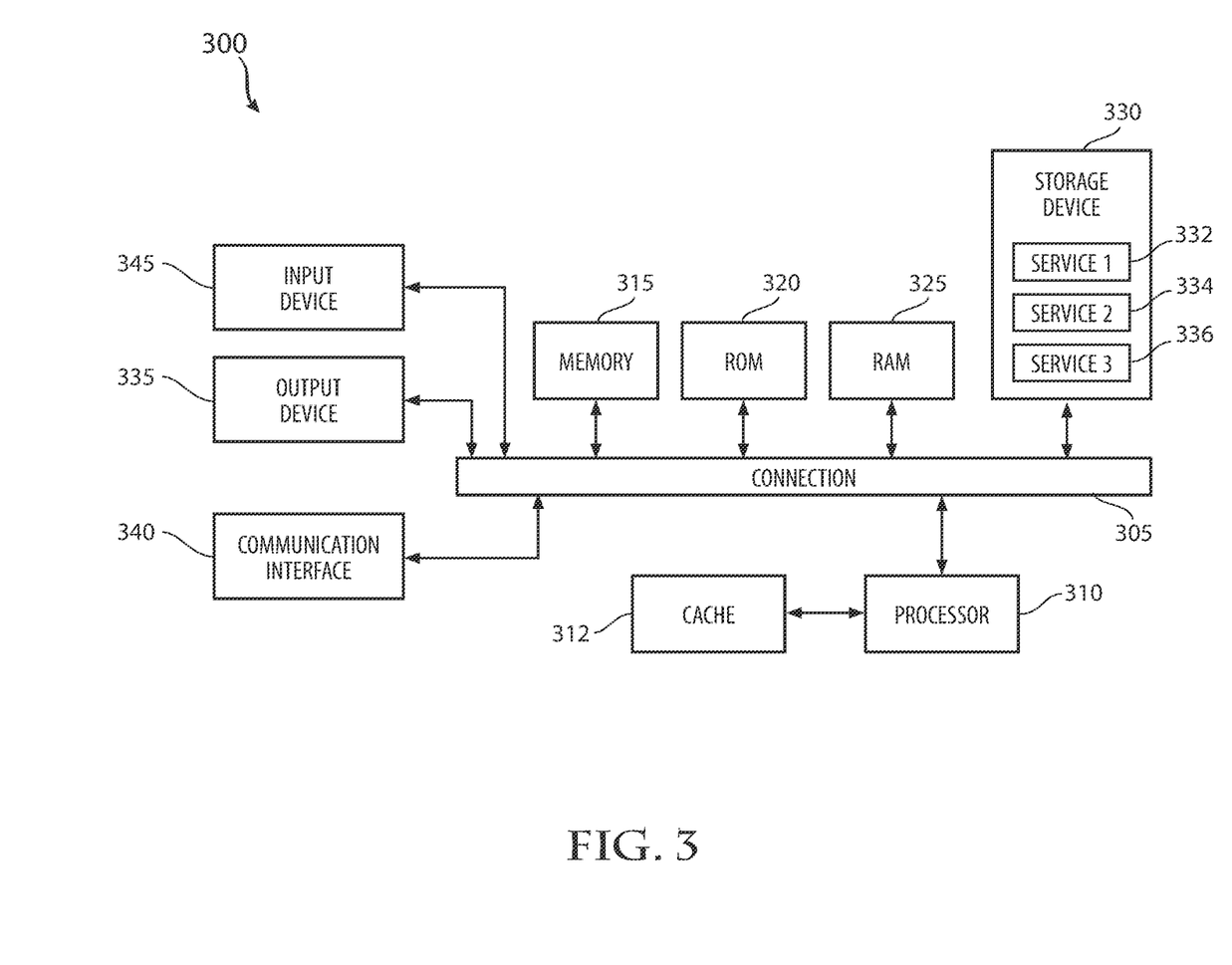
FIG. 3 illustrates a system embodiment.

FIG. 3 illustrates example computer device that can be used in connection with any of the systems disclosed herein.

In this example, FIG. 3 illustrates a computing system 300 including components in electrical communication with each other using a connection 305, such as a bus. System 300 includes a processing unit (CPU or processor) 310 and a system connection 305 that couples various system components including the system memory 315, such as read only memory (ROM) 320 and random access memory (RAM) 325, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. The processor 310 can include any general purpose processor and a hardware or software service or module, such as service (module) 1 332, service (module) 2 334, and service (module) 3 336 stored in storage device 330, configured to control the processor 310 as well as a special-purpose processor where software instructions are incorporated into the actual processor design. The processor 310 may be a completely self-contained computing system, containing multiple cores or processors, a bus, memory controller, cache, etc. A multi-core processor may be symmetric or asymmetric.

To enable user interaction with the device 300, an input device 345 can represent any number of input mechanisms, such as a microphone for speech, a touch-sensitive screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with the device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 325, read only memory (ROM) 320, and hybrids thereof.

The storage device 330 can include services or modules 332, 334, 336 for controlling the processor 310. Other hardware or software modules are contemplated. The storage device 330 can be connected to the system connection 305. In one aspect, a hardware module that performs a particular function can include the software component stored in a computer-readable medium in connection with the necessary hardware components, such as the processor 310, connection 305, output device 335, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method comprising:
generating at a first computing device a random bit $a_i$;
encrypting $a_i$ using quantum-proof homomorphic encryption $\xi$ to yield $\xi_A(a_i)$;
transmitting $\xi_A(a_i)$ to a second computing device;
generating at the second computing device a random bit $b_i$;
encrypting $b_i$ using the quantum-proof homomorphic encryption $\xi$ to yield $\xi_B(b_i)$;
transmitting $\xi_B(b_i)$ to the first computing device; and
generating a common key between the first computing device and the second computing device based on $\xi_A(a_i)$ and $\xi_B(b_i)$.

2. The method of claim 1, wherein multiple random bits are generated at the first computing device and the second computing device.

3. The method of claim 1, wherein generating the common key between the first computing device and the second computing device based on $\xi_A(a_i)$ and $\xi_B(b_i)$ further comprises:
computing, at the first computing device, $\xi_B(b_i+a_i)$; and
transmitting $\xi_B(b_i+a_i)$ from the first computing device to the second computing device.

4. The method of claim 3, further comprising:
computing, at the second computing device, $\xi_A(a_i+b_i)$; and
transmitting $\xi_A(a_i+b_i)$ from the second computing device to the first computing device.

5. The method of claim 3, wherein computing, at the first computing device, $\xi_B(b_i+a_i)$, is performed using homomorphic features of the quantum-proof homomorphic encryption $\xi$.

6. The method of claim 4, further comprising:
decrypting, at the first computing device, $\xi_A(a_i+b_i)$ to yield $a_i+b_i$; and
setting $k_i=a_i+b_i$.

7. The method of claim 4, wherein computing, at the second computing device, $\xi_A(a_i+b_i)$, is performed using homomorphic features of the quantum-proof homomorphic encryption $\xi$.

8. The method of claim 6, further comprising:
decrypting, at the second computing device, $\xi_B(a_i+b_i)$ to yield $a_i+b_i$; and
setting $k_i=a_i+b_i$.

9. The method of claim 8, further comprising:
setting a common key at the first computing device and the second computing device as $k_1+2k_2+\ldots+2^n k_n$.

10. The method of claim 9, further comprising:
using the common key for secure communication between the first computing device and the second computing device.

11. A computing device comprising:
a processor; and
a computer-readable storage device storing instructions which, when executed by the processor, cause the processor to perform operations comprising:
generating a random bit $a_i$;
encrypting $a_i$ using quantum-proof homomorphic encryption $\xi$ to yield $\xi_A(a_i)$;
transmitting $\xi_A(a_i)$ to a second computing device, wherein the second computing device generates a random bit $b_i$ and encrypts $b_i$ using the quantum-proof homomorphic encryption $\xi$ to yield $\xi_B(b_i)$;
receiving $\xi_B(b_i)$ from the second computing device; and
generating a common key between the computing device and the second computing device based on $\xi_A(a_i)$ and $\xi_B(b_i)$.

12. The computing device of claim 11, wherein multiple random bits are generated at the computing device and the second computing device.

13. The computing device of claim 11, wherein generating the common key between the computing device and the second computing device based on $\xi_A(a_i)$ and $\xi_B(b_i)$ further comprises:
computing $\xi_B(b_i+a_i)$; and
transmitting $\xi_B(b_i+a_i)$ to the second computing device.

14. The computing device of claim 13, wherein the second computing device computes $\xi_A(a_i+b_i)$ and wherein the computer-readable storage device stores further instructions which, when executed by the processor, cause the processor to perform operations comprising:
receiving $\xi_A(a_i+b_i)$ from the second computing device.

15. The computing device of claim 13, wherein computing $\xi_B(b_i+a_i)$ is performed using homomorphic features of the quantum-proof homomorphic encryption $\xi$.

16. The computing device of claim 14, wherein the computer-readable storage device stores further instructions which, when executed by the processor, cause the processor to perform operations comprising:
decrypting $\xi_A(a_i+b_i)$ to yield $a_i+b_i$; and
setting $k_i=a_i+b_i$.

17. The computing device of claim 14, wherein computing, at the second computing device, $\xi_A(a_i+b_i)$, is performed using homomorphic features of the quantum-proof homomorphic encryption $\xi$.

18. The computing device of claim 16, wherein the second computing device decrypts $\xi_B(a_i+b_i)$ to yield $a_i+b_i$ and sets $k_i=a_i+b_i$.

19. The computing device of claim 18, wherein the computer-readable storage device stores further instructions which, when executed by the processor, cause the processor to perform operations comprising:
setting a common key at the computing device and the second computing device as $k_1+2k_2+\ldots+2^n k_n$.

20. The computing device of claim 19, wherein the computing device and the second computing device use the common key for secure communication between the computing device and the second computing device.

* * * * *